Nov. 23, 1937.                J. C. KOFOED                2,100,221
                        WEEDING AND CULTIVATING TOOL
                            Filed July 15, 1936
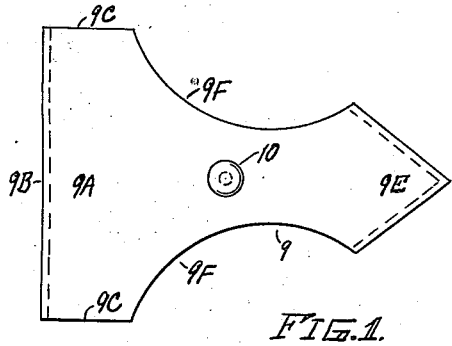
FIG.1.
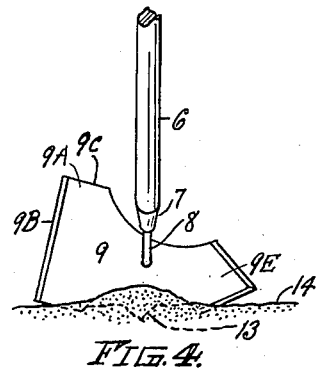
FIG.4.
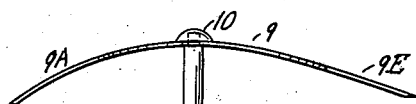
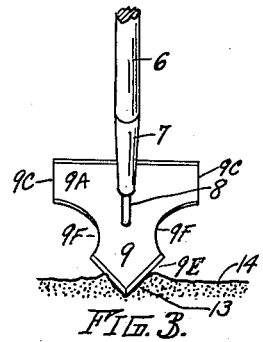
FIG.3.
FIG.2.
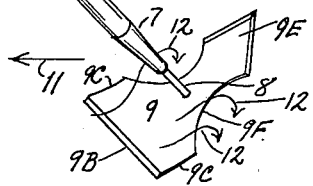
FIG.5.
INVENTOR:
James C. Kofoed
BY David E. Carlsen
ATTORNEY.

Patented Nov. 23, 1937

2,100,221

UNITED STATES PATENT OFFICE 2,100,221

WEEDING AND CULTIVATING TOOL

James C. Kofoed, Northfield, Minn.

Application July 15, 1936, Serial No. 90,652

1 Claim. (Cl. 97—66)

My invention relates to an agricultural implement best designated as a combination weeder and cultivating tool although its utility includes provision for simplifying and facilitating the process of sowing seeds in furrows, etc., as hereinafter fully set forth reference being had to the accompanying drawing, in which:—

Fig. 1 is an end view of the head end of my improved implement.

Fig. 2 is a side elevation of the implement with its head end uppermost.

Fig. 3 is a perspective view, in reduced scale, of the implement being applied as a furrow making device.

Fig. 4 is a perspective view corresponding to Fig. 3 but showing the blade of the device tilted to provide furrow covering action.

Fig. 5 is a perspective, side elevation, of the implement in approximately the usual position it is held for hoeing purposes.

Referring to the drawing by reference numerals, 6 designates an ordinary hoe handle usually about four and one half feet in length and at the foot or front end of which it may be tapered to receive and frictionally retain a metal sleeve 7. In said tapered part is frictionally retained and imbedded longitudinally the rear end part of a preferably round rod stem 8 on the outer end of which is suitably affixed a blade 9 in a plane transverse to the hoe handle as will presently be described.

The preferred method of affixing the blade rigidly to the stem 8 consists of reducing the outer extremity of the latter forming a shoulder, said reduced part projecting into and through a corresponding bore in the blade and at the outer side of the blade the latter and the stem end are brazed together forming a head or button like protuberance 10 which is rounded similarly to a rivet head.

The blade of my implement comprises a single sheet metal piece preferably high quality plate steel said blade designated 9 as a whole and fixed at 10, as described, to the stem and approximately at the center of the blade. At one side of the stem the blade comprises a plate 9A with a straight cutting edge 9B preferably about six inches long, said plate part 9A corresponding to a well known hoe blade but being preferably formed in a continuous arcuate plane concentric of a point in the center line of the handle 7.

The blade 9, on the side of the handle opposite from the hoe part comprises an arrow shaped point designated 9E pointed outward and centrally of the hoe cutting edge. For a blade with 6 inch hoe edge 9B the arrow head part 9E should be about 3 inches wide at its widest part and has preferably beveled cutting edges from the point thereto. Inward of the arrow head the opposite side parts of the blade are arcuate first inwardly from the arrow head thence flaring outward to the sides of the hoe part on a continuous curvature 9F to intersect opposite parallel sides 9C about 2 inches from the beveled edge 9B. This forms a narrowed neck of about two inches width just forward of button 10.

In a preferred construction of the blade 9 its arrow tip is preferably further out from stem 8 than the hoe edge 9B said arrow shaped part being preferably flattened out in a plane tangential to the arc of the hoe blade forward of the stem 8 (see Fig. 2).

In the use of my device several advantages over the usual types of hoes and hand cultivators are apparent, as follows:—For example, in Fig. 5 is illustrated the approximate position the device is held for hoeing and in which weeds and grass are cut and sod cut into by the usual movement of the hoe in the direction indicated by arrow 11. However during this movement with my device the soil and weeds are lifted by the arcuate blade and tumbled over and inverted by the inwardly curved side edges of the blade (9F) in direction indicated by arrows 12 (Fig. 5), a highly desirable and useful action.

In Fig. 3 the point of the arrow shaped end is shown in position pressed downwardly into the surface of the ground 14 to form a shallow furrow 13 in which to plant seeds. After the seeds have been planted the furrows and seeds are easily covered with soil by turning the implement with blade 9 in a plane transverse of the furrow and straddling the furrow with its curved side edge. Then dragging the implement along the open furrow and pressing downward simultaneously the soil on both sides of the furrow is plowed and directed inwardly to and covering the furrow, as best shown in Fig. 4.

It is obvious that the beveled, relatively short cutting edges of the arrow shaped part of the blade make it possible to cultivate in comparatively limited areas as around the base of closely planted plants which areas would be inaccessible with the longer cutting edge 9B of the hoe part of the device.

I claim:

In a weeder and cultivating implement including an elongated handle bar, a metal stem extending forwardly integrally from an end thereof, a cutter blade of flat metal rigidly fixed to the outer end of said stem in a plane at right angles and transversely of the handle bar; said blade comprising a hoe part extending in an arcuate plane to one side of said stem and its outer end comprising a transverse beveled cutting edge, said blade extending on the opposite side of the stem in the form of an arrow head pointed outwardly and having beveled cutting edges from its tip to its widest part, said blade further being formed with continuous arcuate side edges intermediate its arrow shaped head and the cutting edge of the hoe part to form a narrow neck in vicinity of the stem and flaring thence outwardly at opposite sides to the side edges of the hoe part, for the purpose set forth.

JAMES C. KOFOED.